United States Patent
Burroughs (10) Patent No.: US 6,464,231 B2
(45) Date of Patent: Oct. 15, 2002

(54) BELLOWS SEAL WITH SPRING-LOADED RADIAL SECONDARY SEAL

(75) Inventor: Joel Burroughs, Temecula, CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 09/742,557

(22) Filed: Dec. 20, 2000

(65) Prior Publication Data

US 2002/0074732 A1 Jun. 20, 2002

(51) Int. Cl.⁷ ................................................ F16J 15/34
(52) U.S. Cl. ........................ 277/385; 277/393; 277/395
(58) Field of Search ................................ 277/379, 382, 277/385, 389–91, 393, 395–7

(56) References Cited

U.S. PATENT DOCUMENTS

| | | | |
|---|---|---|---|
| 2,100,220 | A | 11/1937 | King |
| 2,220,771 | A | 11/1940 | McHugh |
| 2,328,578 | A * | 9/1943 | Payne |
| 2,378,095 | A * | 6/1945 | Payne |
| 2,590,759 | A * | 3/1952 | Dale et al. |
| 2,814,449 | A * | 11/1957 | Wieczorek |
| 2,871,039 | A * | 1/1959 | Payne |
| 2,964,340 | A * | 12/1960 | Kinzie et al. |
| 3,508,736 | A * | 4/1970 | Rhodes et al. |
| 3,572,727 | A * | 3/1971 | Greiner |
| 3,897,957 | A | 8/1975 | Warner |
| 3,947,045 | A * | 3/1976 | Schmidt |
| 4,133,542 | A | 1/1979 | Janian et al. |
| 4,175,753 | A | 11/1979 | Wentworth, Jr. |
| 4,183,541 | A * | 1/1980 | Wentworth, Jr. |
| 4,241,927 | A * | 12/1980 | Wiese |
| 4,365,816 | A | 12/1982 | Johnson et al. |
| 4,586,718 | A | 5/1986 | Stephenson et al. |
| 4,596,394 | A | 6/1986 | Schmitt |
| 4,971,337 | A * | 11/1990 | Hufford |
| 5,370,403 | A | 12/1994 | Sedy |
| 5,403,169 | A | 4/1995 | Yokoi et al. |
| 5,551,708 | A | 9/1996 | Vesey et al. |
| 5,560,622 | A * | 10/1996 | Sedy |
| 5,700,013 | A * | 12/1997 | Baty |
| 5,813,674 | A | 9/1998 | Dickie et al. |
| 5,901,965 | A | 5/1999 | Ringer et al. |
| 5,924,697 | A * | 7/1999 | Parker et al. ............... 277/369 |
| 6,116,610 | A | 9/2000 | Goldswain et al. |

FOREIGN PATENT DOCUMENTS

| | | |
|---|---|---|
| DE | 4124531 C1 | 11/1992 |
| EP | 0168162 A1 | 1/1986 |
| EP | 0178070 A1 | 4/1986 |
| EP | 0867647 A2 | 9/1998 |

* cited by examiner

*Primary Examiner*—Anthony Knight
*Assistant Examiner*—Alison K. Pickard
(74) *Attorney, Agent, or Firm*—Flynn, Thiel, Boutell & Tanis, P.C.

(57) ABSTRACT

A mechanical seal of the invention includes relatively rotatable seal rings and a secondary seal therefore. The secondary seal is a C-shaped spring loaded gasket having upper and lower gasket legs. The gasket is provided between two of the seal components, for example, between an axially movable seal ring and a bellows flange. The gasket has one leg thereof confined axially to transmit axial loads between the seal ring and the bellows flange. Also, the upper and lower gasket legs are biased axially apart by a spring to permit radial movement between the seal ring and the bellows flange and also accommodate different rates of thermal expansion between the seal ring and bellows flange.

30 Claims, 5 Drawing Sheets

BELLOWS SEAL WITH SPRING-LOADED RADIAL SECONDARY SEAL

FIELD OF THE INVENTION

This invention relates to a mechanical seal and more particularly, to a secondary seal arrangement for a bellows type mechanical seal.

BACKGROUND OF THE INVENTION

Mechanical face seals are used on various types of machines and equipment, such as pumps, compressors, and turbines which have a rotating shaft and a sealing chamber adjacent the shaft wherein the mechanical seal prevents leakage of fluid from the sealing chamber. Many such mechanical seals include a pair of adjacent seal rings which have opposing seal faces that define a sealing region therebetween to sealingly separate the sealing chamber from an exterior region. Typically, one of the seal rings is mounted on the shaft so as to rotate therewith while the other stationary seal ring is non-rotatably mounted on a seal housing.

Also, at least one of the rotating and stationary seal rings is axially movable. To maintain a seal between the opposed seal faces, the axially movable seal ring is axially loaded, such as by a spring or bellows, towards the other seal ring.

While the sealing region between the relatively rotatable seal faces defines the primary seal, secondary seals are provided between other adjacent components in the mechanical seal. For example, a secondary seal between the rotatable seal ring and the shaft or a shaft sleeve prevents migration of the sealed fluid therebetween, while a secondary seal between the stationary seal ring and a support element therefor prevents migration of the sealed fluid between these components.

More particularly as to a bellows type mechanical seal, a bellows is provided that typically has a bellows adapter at one end which connects to the seal housing and a bellows flange at the opposite end which supports the stationary seal ring. The bellows seals the space between the stationary sealing ring and the seal housing and also applies an axial load to the stationary seal ring which seal ring is biased axially into sealing engagement with the rotatable seal ring. Secondary seals also are provided between the bellows flange and the stationary seal ring and the bellows adapter and the seal housing.

For example, one bellows arrangement is disclosed in U.S. Pat. No. 5,901,965 wherein an O-ring defines a secondary seal between a non-rotatable or stationary seal ring and its holder. The O-ring only abuts against an outer axial surface of the seal ring. Thus, to transmit the axial load of the bellows to the stationary seal ring, the holder thereof includes a front surface which abuts against an opposing back surface of the seal ring. As a result, frictional contact between the opposed surfaces may result in undesirable seal face distortions.

In another bellows seal disclosed in U.S. Pat. No. 4,365,816, a flexible seal member with an L-shaped cross section is provided between a seal ring cup and a seal ring supported therein.

Also in spring type seals, U.S. Pat. No. 5,813,674 defines a non-bellows seal arrangement wherein a secondary seal between a seal ring and a seal ring holder is a gasket which has a C-shaped cross section and a spring disposed within the gasket. Another seal arrangement having a spring energized plastic seal is disclosed in U.S. Pat. No. 6,116,610.

However, these spring energized secondary seals can slide axially and thus, do not support the axial loads between the spring and the seal ring.

An object of the invention is to provide a mechanical seal having an improved secondary seal arrangement which overcomes disadvantages associated with known mechanical seals.

In accord therewith, the invention relates to a mechanical seal having a spring loaded secondary seal which resiliently permits relative radial movement between a seal ring and a support element therefor, such as a bellows flange, and also supports axial loads between the seal ring and the support element.

In particular, a bellows type mechanical seal is provided wherein a non-rotatable, i.e. stationary, seal ring is axially movable and is axially loaded by a bellows which connects the stationary seal ring to the seal housing. The bellows includes a bellows flange at one end thereof which defines a support element that seats the stationary seal ring therein and has a secondary seal gasket therebetween. The opposite end of the bellows includes an annular adapter which seats within the seal housing and also has a secondary seal gasket therebetween. A further secondary seal gasket is provided between the rotatable seal ring and a support element therefor, namely a shaft sleeve.

The improved secondary seal gasket of the invention is provided in this mechanical seal preferably between the stationary seal ring and bellows flange and the rotating ring and the shaft sleeve, although the secondary seal of the invention also is usable for the bellows adapter.

The secondary seal gasket is an annular gasket having a C-shaped cross sectional shape defined by upper and lower legs and an end wall. The upper and lower legs and the end wall define a gasket jacket in which an annular spring is received. The annular spring is disposed between the legs to press the legs radially away from each other into sealing engagement with opposed surfaces of the bellows flange and a gasket shoulder defined on the seal ring. The upper and lower gasket legs therefore can move radially relative to each other to accommodate relative radial motion between the seal ring and the support element, thus reducing seal face distortion due to vibrations, differential thermal expansion or contraction, and differential pressure expansion or contraction. Further, spring and pressure forces act on and through the gasket jacket to effectively center the seal ring.

Additionally, the lower gasket leg is confined axially between an end wall of the gasket shoulder and an opposing face of the bellows flange such that the axial loads applied on the bellows flange by the bellows are transmitted axially to the seal ring through the lower gasket leg. While the lower leg is resilient, the lower leg is constrained axially and therefore is stiff in that direction, particularly since a hydraulic pressure force between the gasket legs stabilizes the lower leg and prevents buckling under axial loads.

The secondary seal arrangement and its application in a bellows type mechanical seal provides an improved seal having substantial axial load support while allowing radial motion of the parts which minimizes distortion of the faces and improves seal performance. Additionally, the radial position of the gasket shoulder relative to the mean bellows diameter serves to minimize the magnitude of the axial loads acting on the lower gasket leg even under full pressurization of the sealing chamber.

Other objects and purposes of the invention, and variations thereof, will be apparent upon reading the following specification and inspecting the accompanying drawings.

BRIEF DESCRIPTION OF THE DRAWINGS

FIG. 4 shows the bellows flange location relative to the stationary face at operating temperatures. The change with temperature can be seen by comparing it with FIG. 2.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
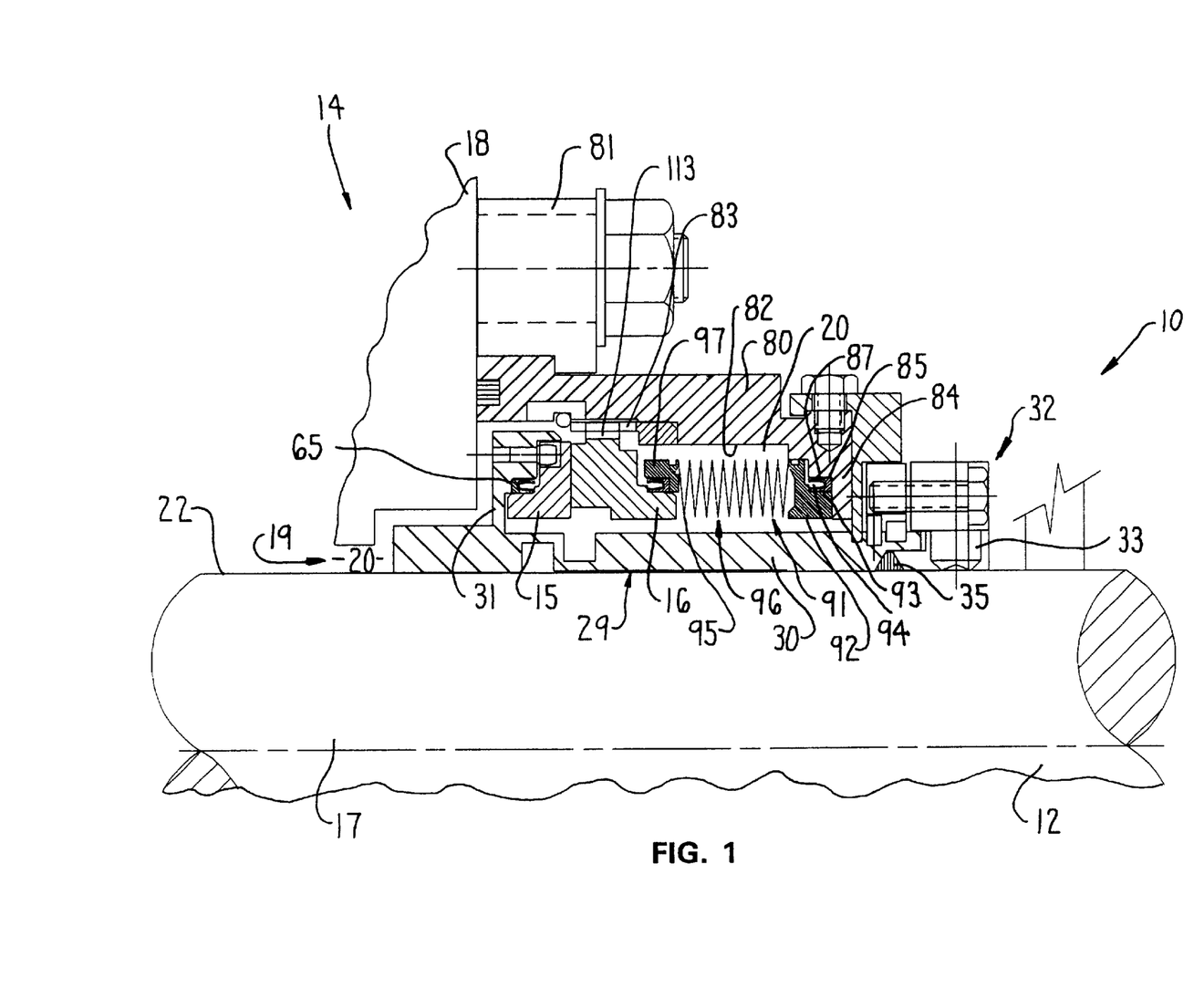
FIG. 1 is a cross sectional view of a bellows type mechanical seal of the invention which is mounted on a rotating shaft and includes an inventive secondary seal arrangement.

Referring to FIG. 1, a bellows type mechanical face seal 10 is mounted on a rotatable shaft 12 of a machine 14. The mechanical seal 10 includes a pair of concentric, relatively rotatable seal rings 15 and 16 which effectively prevent fluid leakage along the shaft 12.

The machine 14 may be any type of equipment having a rotatable shaft therein, which said shaft 12 is rotatable about an axis 17. Examples of such equipment include pumps, compressors, turbines and the like. The machine 14 includes an annular machine housing 18 which defines a seal chamber 19 that surrounds the rotating shaft 12 and confines the fluid 20 being sealed therein. In the embodiment of FIG. 1, the fluid 20 being sealed may be a liquid such as a pump fluid found in the impeller chamber of a pump although other fluids such as compressor gases and steam may instead be present. It will be understood that the inventive secondary seal arrangement of the invention may be adapted for use in other seal applications.

The machine 14 further includes a motor which rotates the shaft 12, which shaft 12 has a conventional circular cross section defined by an outer circumferential shaft surface 22. As such, the shaft 12 rotates relative to the machine housing 18. In order to prevent leakage of the fluid 20 from the seal chamber 19, the mechanical seal 10 is connected between the machine housing 18 and the shaft 12.

Figure 2:
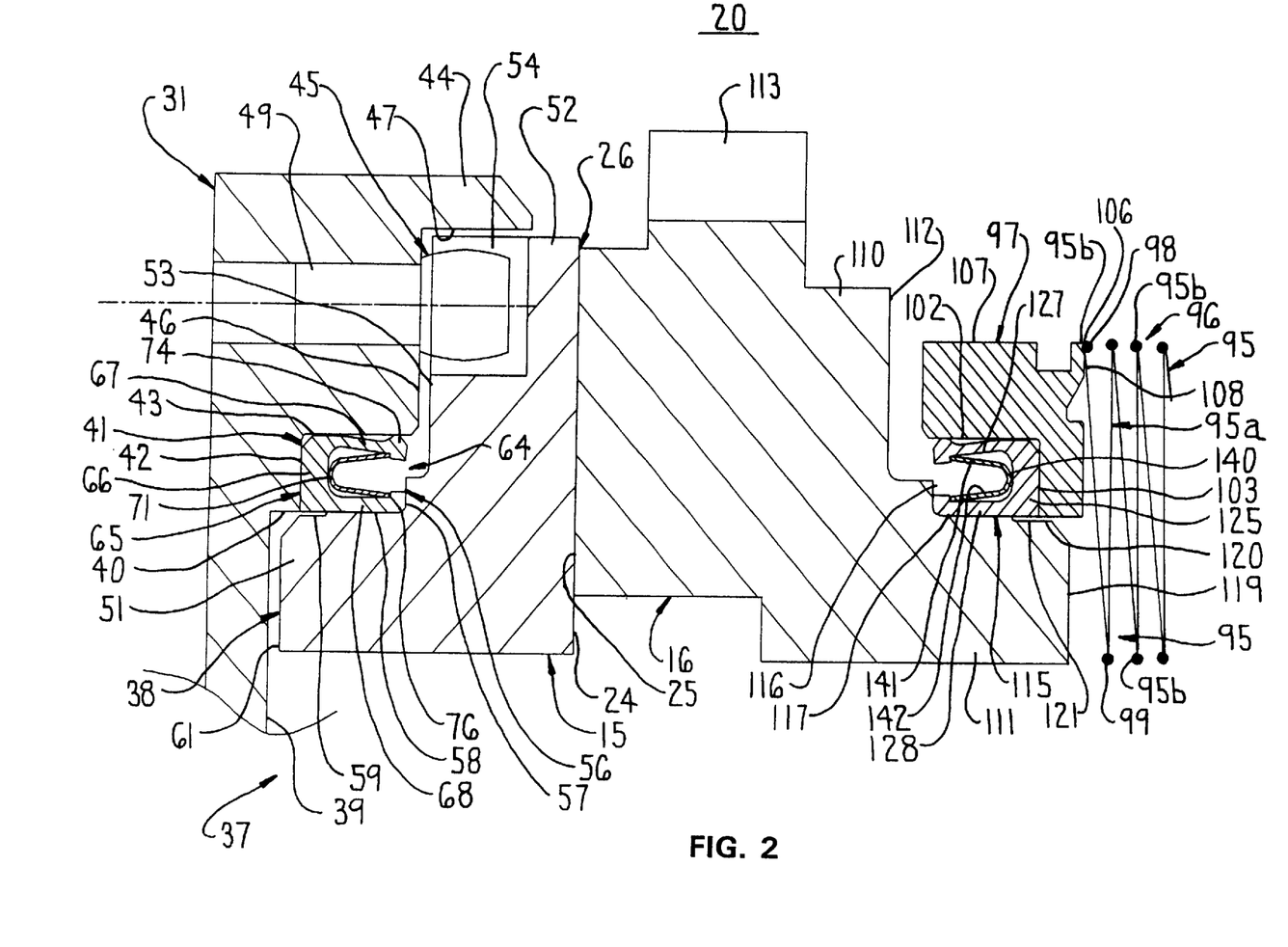
FIG. 2 is an enlarged side cross sectional view of a pair of relatively rotatable seal rings.
Figure 3:
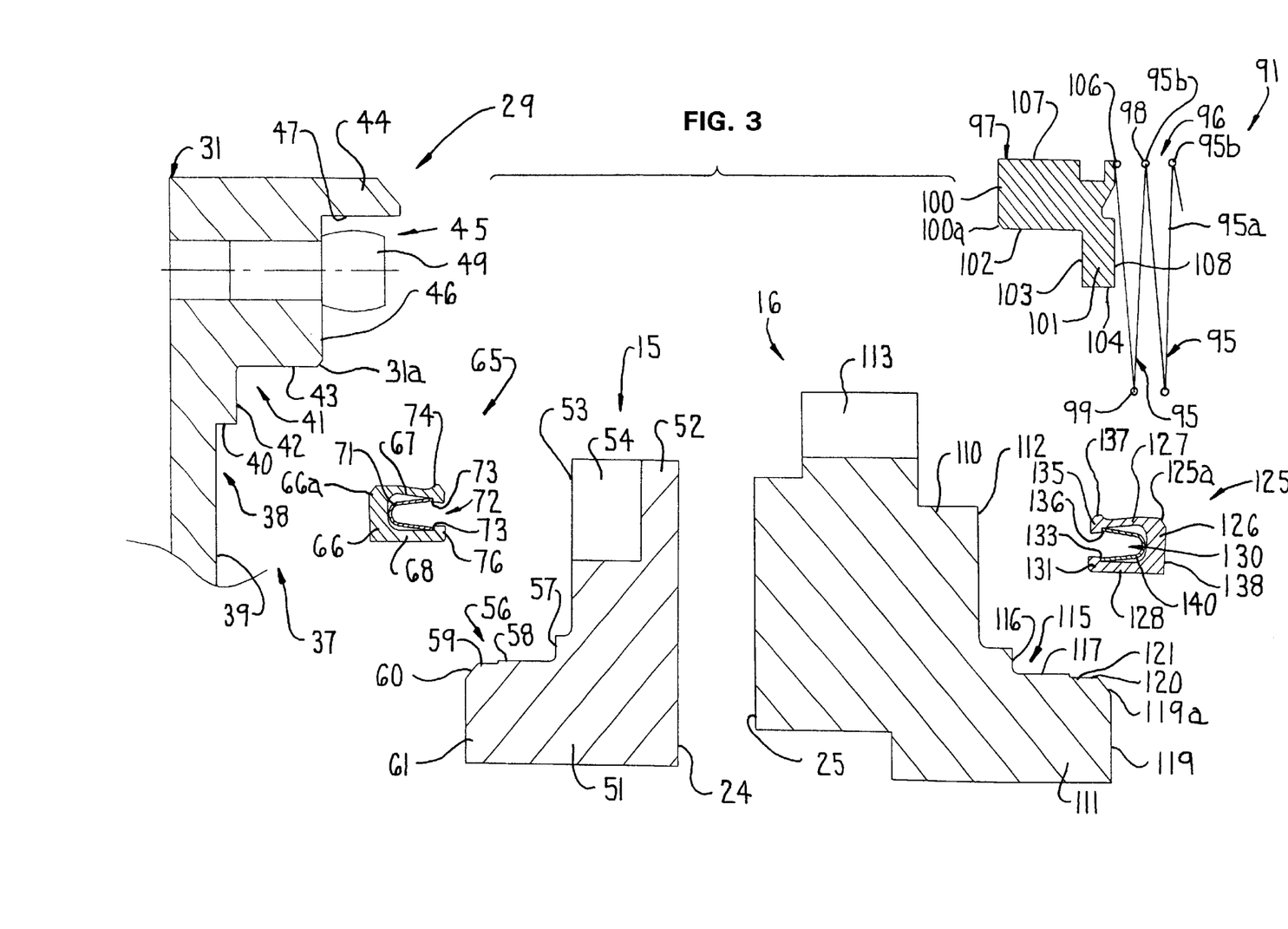
FIG. 3 is an exploded view of FIG. 2.

More particularly as to the mechanical seal 10, the seal 10 includes the rotatable seal ring 15 which is mounted to the shaft 12 and accordingly, rotates therewith, and the stationary seal ring 16 which is non-rotatably mounted to the machine housing 18. The rotatable seal ring 15 and the stationary seal ring 16 therefore are relatively rotatable, and as seen in FIGS. 2 and 3, include respective seal faces 24 and 25 which face axially toward each other in opposing relation to define a sealing region 26 therebetween. The sealing region 26 is defined radially across the seal faces 15 and 16 and prevents or at least minimizes leakage of the chamber fluid 20 through the sealing region 26 during shaft rotation.

Referring to FIG. 1, as to the individual components of the mechanical seal 10, a shaft sleeve 29 is mounted non-rotatably to the shaft 12. The shaft sleeve 29 concentrically surrounds the shaft 12 and has a generally L-shaped cross-section defined by a tubular shaft section 30 and an annular sleeve flange or backing flange 31 which projects radially outwardly from an inner end of the shaft section 30.

The outer end of the shaft sleeve 29 is secured on the shaft 12 by a drive collar 32 which includes set screws 33 directed radially into engagement with the outer shaft surface 22. The fluid 20 is prevented from leaking along between the shaft sleeve 29 and the shaft 12 by an annular, sleeve gasket 35 disposed sealingly between the inner surface of the shaft section 30 and the outer shaft surface 22. The sleeve gasket 35 preferably is made of flexible graphite.

The sleeve flange 31 of the shaft sleeve 29 projects radially outwardly to support the rotatable seal ring 15 thereon. Referring to FIGS. 2 and 3, the backing flange 31 generally defines an annular, L-shaped pocket 37 that corresponds to the L-shape of the seal ring 15.

In particular, the sleeve flange 31 includes an inner step 38 defined by an inner radial surface 39 and an inner axial surface 40. Radially outwardly therefrom, a secondary seal seat 41 is formed which is defined by a radial seat surface 42 and an axial seat surface 43.

Lastly, the backing flange 31 includes an axial rim 44 which projects axially and is cantilevered to define an outer step 45. The outer step 45 defines an outer radial surface 46 and an outer axial surface 47. To rotatingly drive the seal ring 15, circumferentially spaced apart drive pins 49 project axially from the outer radial surface 46 into the open space of the outer step 45.

The seal ring 15 seats within the seal ring seat 37 as seen in FIG. 2. In particular, the seal ring 15 (FIGS. 2 and 3) has an L-shaped cross section define by an axial extension 51 and a radial extension 52 which projects radially outwardly from the axial extension 51. The radial extension 52 includes an outer back face 53 having drive notches 54. The drive notches 54 open rearwardly and outwardly, and receive the projecting ends of the drive pins 49 therein so that the seal ring 15 rotates in combination with the shaft sleeve 29 during shaft rotation. While the seal ring 15 is restrained circumferentially by the drive pins 49, the seal ring 15 otherwise does not contact the shaft sleeve 29 axially or radially.

The seal ring 15 also is defined with an annular gasket shoulder 56 at the corner juncture between the axial and radial ring extensions 51 and 52. The gasket shoulder 56 is defined by a wall surface 57 which faces axially rearwardly and is offset a short distance rearwardly of the outer back face 53. The shoulder 56 also is defined by a shoulder side surface 58 which faces radially outwardly toward the axial seat surface 43 in radially spaced relation therewith. The shoulder side surface 58 terminates in the rearward direction at a small clearance step 59 which clearance step 59 extends rearwardly the remaining axial distance to a chamfer 60 (FIG. 3). The chamfer 60 (FIG. 3) is provided between the clearance step 59 and inner back surface 61 defined at the back of the axial seal extension 51.

Referring to FIG. 2, the seal shoulder 56 and the opposing secondary seal seat 41 thereby have opposing surfaces which are radially and axially spaced apart to define an annular pocket 64 in which a secondary seal gasket 65 is received. Generally, the secondary seal 65 (FIGS. 2 and 3) is an annular gasket. The gasket 65 generally has a C-shaped cross section which shape is defined by a radial gasket wall 66 and upper and lower legs 67 and 68 respectively which extend axially from the gasket wall 66.

The gasket 65 preferably has an inside diameter (ID) which is slightly smaller than the diameter of the gasket shoulder side surface 58 to define a snug fit therebetween. The ring chamfer 60 (FIG. 3) facilitates sliding of the gasket 65 onto the axial ring extension 51.

Further, the gasket 65 includes a chamfer 66a (FIG. 3) which cooperates with a chamfer 31a on the sleeve flange 31 to facilitate assembly.

The gasket 65 preferably is formed from a carbon impregnated PTFE. It is understood that other flexible materials may be used such as elastomeric materials, pure PTFE, flexible graphite, flexible metal, and the like.

Referring to FIGS. 2 and 3, the lower gasket leg 68 abuts radially inwardly against the shoulder side surface 58 while the upper gasket leg 67 abuts radially outwardly against the axial seat surface 43 to define a radial seal therebetween and prevent leakage of the fluid 20 between the back of the seal ring 15 and the sleeve flange 31.

More particularly, the upper and lower gasket legs 67 and 68 are pressed radially away from each other by an interior spring 71 which is annular and has a C-shaped cross section. Preferably, the spring is made from elgiloy or other alloy that is corrosion resistant and can withstand high temperatures. Referring to FIG. 3, the gasket legs 67 and 68 define an annular slot 72 therebetween which opens forwardly, and the spring 71 is retained axially within the slot 72 by stop surfaces 73 formed at the free ends of the legs 67 and 68.

Further, the free end of the outer leg 67 also includes a radial rib 74 (FIGS. 2 and 3) which sealingly abuts against the axial seat surface 43. When seated within the pocket 64, the upper leg 67 deflects radially inwardly due to the rib 74.

Referring to FIGS. 2 and 3, since the upper and lower legs 67 and 68 are spaced radially apart and are supported radially by a spring 71 which is resiliently deflectable, the sleeve flange 31 can move radially relative to the seal ring 15 which minimizes undesirable radial loads, such as friction loads, on the seal ring 15 which might otherwise distort the seal face 24 or compromise seal ring performance. In this regard, the clearance step 59 is placed to define a clear pressure boundary on gasket shoulder 56, to ensure that the gasket wall 66 is spaced radially from the seal ring 15 and does not introduce any unanticipated forces as from material swelling or expansion, and to provide a clearance for inner step 38 which supports the gasket 65 and prevents extrusion thereof.

In addition to the foregoing, the lower leg 68 extends along the shoulder side surface 58 and has a front end 76 which abuts against the shoulder end wall 57. Since the gasket wall 66 abuts against the opposing radial seat surface 42 of the sleeve flange 31, the gasket 65 is confined axially. When the sealing chamber 19 (FIG. 1) is pressurized, axial loads typically are transmitted to the rotatable seal ring 15 which is pressed toward the sleeve flange 31. However, when the seal ring 15 is pressed axially toward the sleeve flange 31, the axial load is supported by the lower leg 68 (FIGS. 2 and 3).

Referring to FIGS. 2 and 3, since the open side of the interior gasket slot 72 is exposed to the fluid 20 when pressurized, the hydraulic fluid pressure acts within the gasket slot 72 and thus, presses the lower leg 68 radially inwardly against the shoulder side wall 58 and effectively stiffens the lower leg 68. This hydraulic fluid pressure thereby prevents the lower leg 68 from buckling even under significant axial loads and even though the gasket 65 is formed of a material having a low modulus and strength.

The above-described gasket arrangement 65 thereby allows relative radial movement of the sleeve flange 31 relative to the seal ring 15 due to the relative radial movement permitted between the upper and lower gasket legs 67 and 68. The gasket 65 also is confined axially and thus, can support significant axial loads. The same type of gasket seal is provided on the seal ring 16 to provide the same advantages as well as additional advantages as will be described hereinafter. For example, the seal ring 15 is made of a silicon carbide face material and the sleeve flange 31 is made of metal whereby the gasket 65 also accommodates radial expansion of the sleeve flange 31 and seal ring 15 due to thermal expansion. This advantage will be discussed herein relative to the seal ring 16.

Referring to FIG. 1, generally as to the mounting of the stationary seal ring 16, the mechanical seal 10 includes an annular seal gland or seal housing 80 which is mounted to the machine housing 18 by a mounting collar 81. The seal housing 80 surrounds the shaft sleeve 29 and the rotatable seal ring 15 mounted thereto and further surrounds the stationary seal ring 16 as described hereinafter.

More particularly, the inside surface 82 of the seal housing 80 includes circumferentially spaced apart axial ribs 83 which are disposed radially outwardly of the stationary seal ring 16 for maintaining the seal ring 16 stationary during shaft rotation. The seal housing 80 also includes an end wall 84 which projects radially inwardly toward the shaft 12, which said end wall 84 includes a gasket pocket 85. The gasket pocket 85 is formed substantially the same as the gasket seat 41 (FIGS. 2 and 3) of the sleeve flange 31, as defined by the radial seat surface 42 and the axial seat surface 43, except that the gasket pocket 85 opens in the opposite axial direction. The gasket pocket 85 includes a seat gasket 87 therein that is formed identical to the gasket 65 described above.

The seat gasket 87 cooperates with an edge welded metal bellows assembly 91 which generally connects the stationary seal ring 16 to the seal housing 80.

As seen in FIG. 1, the outermost end of the bellows assembly 91 includes an annular adapter 92 which is engaged with the end wall 84. The adapter 92 has an L-shaped cross section which generally corresponds to the L-shape of the seal ring 15, and further includes an annular gasket shoulder 93 which is identical to the gasket shoulder 56 (FIGS. 2 and 3) formed on the seal ring 15. The gasket pocket 94 (FIG. 1) includes the seat gasket 87 therein which seat gasket 87 accommodates radial and axial loads in a manner substantially the same as the rotatable ring gasket 65. The seat gasket 87 thereby accommodates axial loads acting on the bellows adapter 92 by the bellows assembly 91 and also dampens radial movement of the bellows adapter 92 such as due to vibrations. Since the rotatable ring gasket 65 and the seat gasket 87 are structurally and functionally the same as each other, a more detailed description as to the bellows adapter 92 and the gasket shoulder 94 thereof is not believed necessary.

Referring to FIG. 1, the bellows assembly 91 further includes a bellows 96 formed of a plurality of convolutions 95 that extend axially between the bellows adapter 92 and the bellows flange 97. A single convolution 95 is defined by two annular thin diaphragms 95a welded together as indicated by weld beads 95b, the first two diaphragms 95a being welded at the inner diameter (ID) 99 as illustrated in FIG. 2. Each convolution extends radially from the ID 99 to an outside diameter (OD) 98 where adjacent convolutions 95a are welded together to form the core of the bellows assembly 91 to which the bellows flange 97 and the bellows adapter 92 are welded to complete the assembly. The diaphragms 95a and the convolutions 95 defined thereby are resiliently deflectable axially but are sufficiently stiff to axially bias the bellows flange 97 inwardly in the direction of the seal rings 15 and 16.

Figure 4:
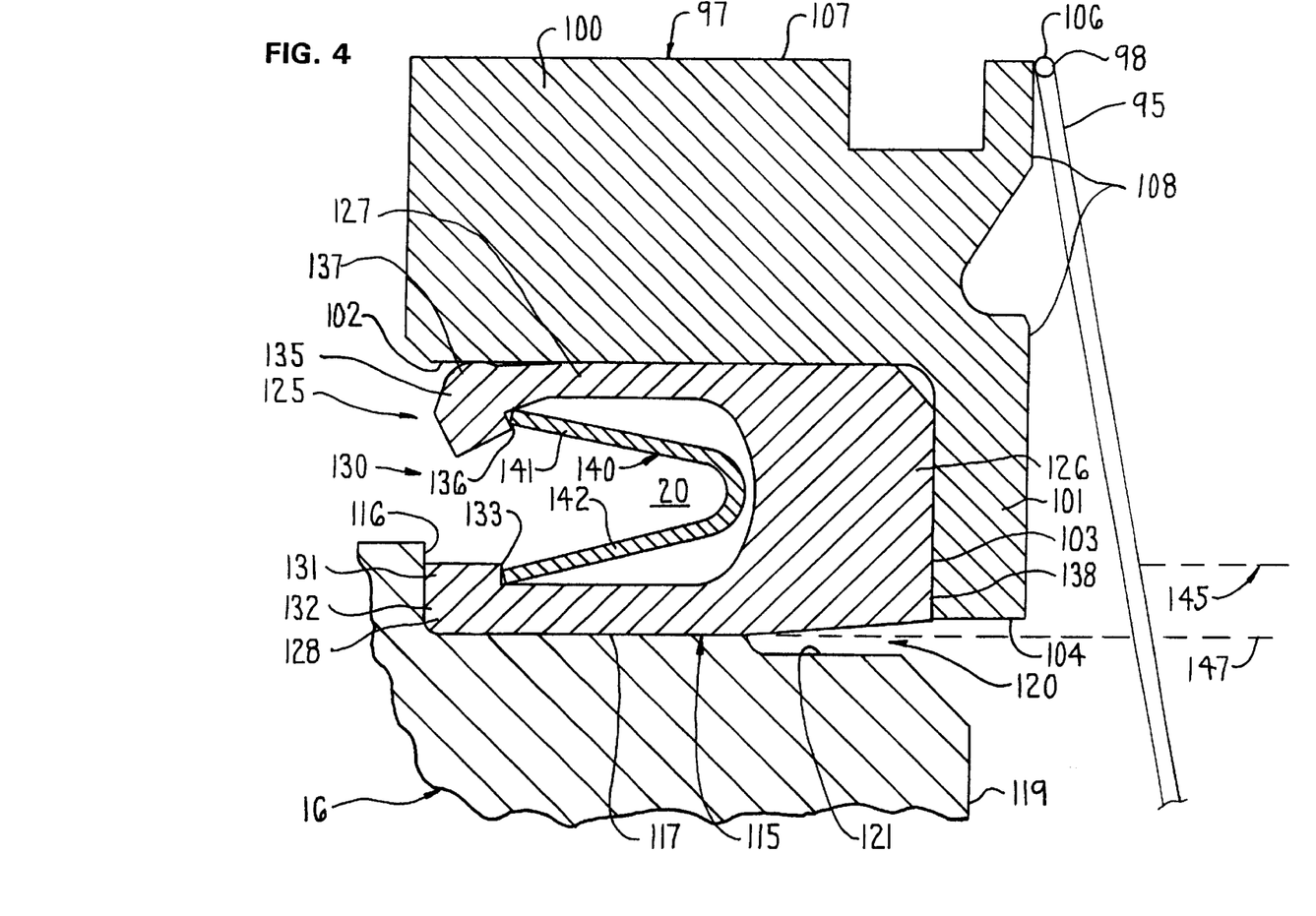
FIG. 4 is an enlarged cross sectional view of the axially movable seal ring supported in a bellows flange and having a spring-loaded secondary seal gasket between the seal ring and the bellows flange.

In FIG. 3 and 4, the bellows flange 97 has an L-shaped cross section defined by an axial leg 100 and a radial leg 101 which projects inwardly therefrom. The axial leg 100 defines an axial flange surface 102 which faces radially inwardly and a radial flange surface 103 which faces axially. The radial leg 101 terminates radially inwardly at an inner surface 104, and the bellows flange 97 is rigidly connected to the diaphragm 96 by a weld 106 at the outside diameter 107 adjacent to the back flange surface 108. As described hereinafter, the bellows flange 97 is sealingly connected to the stationary seal ring 16 in order to support the seal ring 16 and axially bias the seal ring into sealing engagement with the opposing rotatable seal ring 15.

Referring to FIGS. 1 and 2, with the above-described arrangement, the seal ring 16 is non-rotatably supported on the seal housing 80 while the opposing seal ring 15 is rotatably supported on the shaft 12 so as to rotate in unison therewith. When the shaft 12 is not rotating, the opposing seal faces 24 and 25 (FIG. 2) are disposed in sealing relation to prevent migration of the fluid 20 radially inwardly across the sealing region 26.

During shaft rotation, the spring loading of the seal ring 16 (FIG. 1) by the bellows assembly 91 permits the seal ring 16 to be displaced axially away from the seal face. Therefore, during this shaft rotation, the seal faces 24 and 25 (FIG. 2) separate slightly whereby a fluid film is defined therebetween. Even though seal face separation is permitted, the bellows assembly 91 (FIG. 1) and hydraulic fluid pressure from the fluid 20 continues to generate a closing force which biases the seal ring 16 toward the seal ring 15.

More particularly as to the seal ring 16 illustrated in FIGS. 2 and 3, the seal ring 16 has a generally L-shaped cross sectional shape defined by a main ring body 110 and an axial extension 111 which projects axially rearwardly away from an inside diameter of the main body 110. The seal ring 16 preferably is formed of a silicon carbide seal material although other suitable seal face materials such as carbon may be used.

The main body 110 includes the front face 25 which cooperates with the opposing seal face 24 of the seal ring 15 to define the sealing region 26 therebetween.

The main body 110 also includes back face 112 and grooves 113 which are spaced circumferentially on the outside diameter of the main body 110. The grooves 113 are open on both axial ends and open radially outwardly so as to slidably engage the ribs 83 (FIG. 1) on the seal housing 80. The cooperating ribs 83 and grooves 113 (FIGS. 2 and 3) thereby prevent rotation of the seal ring 16 during rotation of the opposed seal ring 15 with the shaft 12 (FIG. 1). Since the grooves 113 (FIGS. 2 and 3) open from both ends, however, the seal ring 16 is still displaceable axially relative to the rotatable seal ring 15.

Referring to FIGS. 2 and 3, the axial extension 111 of the seal ring 16 is formed substantially the same as the axial leg 51 on the rotatable seal ring 15. In particular, the axial ring extension 111 includes a gasket shoulder 115 which is defined by a shoulder end face 116 that faces axially away from the main body 110, and a shoulder side surface 117 which faces radially outwardly and extends axially away from the shoulder end surface 116. A clearance step 120 is defined axially between the side surface 117 and the chamfer 119a (FIG. 3). The clearance step 120 has a smaller diameter than the gasket shoulder 115 and thus, a clearance face 121 of the clearance step 120 is offset radially inwardly of the shoulder side surface 117. The chamfer 119a is provided between the clearance face 121 and the back face 119 to ease assembly of the gasket 125 onto the gasket shoulder 115.

As described hereinafter, the bellows flange 97 (FIG. 1) is non-rotatably connected to the seal ring 16 by a bellows gasket 125, which said bellows gasket 125 is formed identical to the rotating seal ring gasket 65 and the seat gasket 87. The bellows gasket 125 includes a chamfer 125a (FIG. 3) that cooperates with a chamfer 100a on the bellows flange 97 to facilitate assembly.

Referring to FIGS. 3 and 4, the bellows gasket 125 is C-shaped which shape is defined by a radial gasket wall 126 and upper and lower gasket legs 127 and 128 which extend axially away from the gasket wall 126. The upper and lower legs 127 and 128 are generally parallel to each other but in radially spaced relation to thereby define a gasket slot 130 which opens axially therefrom. The free end 131 of the lower leg terminates at an end face 132 which abuts against the opposing end wall 116 of the gasket shoulder 115. The free end 131 is stepped to define a stop surface 133 which faces axially inwardly into the gasket slot 130.

As for the upper gasket leg 127, the free end 135 thereof includes a further stop surface 136 that faces axially into the interior of the gasket slot 130. The leg end 135 also includes a circumferential rib 137 that projects radially outwardly from the upper leg 127.

Additionally, an annular gasket spring 140 is fitted into the gasket slot 130 to press the upper and lower gasket legs 127 and 128 radially apart. Normally, as illustrated in FIG. 2, the spring 140 has its upper and lower spring legs 141 and 142 deflected in compression so as to press the respective gasket legs 127 and 128 upwardly into contact with the opposing axial flange surface 102 and the shoulder side surface 117. As such, the respective legs 127 and 128 sealingly contact the surfaces 102 and 117 to prevent the leakage of the fluid 20 being sealed between the bellows flange 97 and the stationary seal ring 16.

The gasket end wall 126, however, is disposed radially adjacent to the clearance step 120 so as to be spaced radially therefrom such that the seal ring 16 does not introduce unanticipated forces from material swelling or expansion. The clearance step 120 furthermore defines a clear pressure boundary on gasket shoulder 115 and provides a clearance for flange extension 101 which supports the gasket 125 and prevents extrusion thereof.

As a result of this flexible radial load support, the gasket 125 reduces undesirable loads being transmitted to the seal ring 16 from the bellows flange 97 and reduces hysteresis and face distortion. This allows the seal faces 24 and 25 to continue to run flat throughout the entire operating range of the seal to eliminate wear between the seal faces 24 and 25. Further, the resiliency of the gasket 125 and the spring 140 serves to center the seal ring 16, and also serves to dampen bellows vibrations.

Referring to FIGS. 3 and 4, in addition to the radial resiliency, the gasket 125 also provides much stiffer axial load support so that the axial load of the bellows flange 97 is transmitted to the stationary seal ring 16. In particular, the same as the gaskets 65 and 87 (FIG. 1), the lower gasket leg 128 (FIGS. 3 and 4) is confined axially. In particular, the end face 132 of the lower leg 128 abuts against the end wall 116 of the gasket shoulder 115 while the end face 138 of the gasket wall 126 abuts against the opposing radial flange surface 103 of the bellows flange 97. Thus, as the bellows flange 97 is biased axially towards the seal ring 16, this axial load is transmitted axially to the seal ring 16 through the lower gasket leg 128.

Since the gasket slot 130 is open to the hydraulic fluid pressure of the fluid 20, the hydraulic fluid pressure acts radially inwardly on the lower leg 128 to further stiffen the lower leg 128 and prevent buckling of the lower leg 128 even under relatively high axial loads.

Under such hydraulic fluid pressures, the upper leg 127 also is pressed upwardly so as to lie flat against the axial face 102 of the bellows flange 97 as generally illustrated in FIG. 4. This expansion of the upper leg 127 also occurs in the same manner with respect to the upper leg 67 (FIG. 3) of the gasket 65 and the upper leg of the seat gasket 87 (FIG. 1) since both of the gaskets 65 and 87 receive the hydraulic fluid pressure of the fluid 20 therein.

Still further, the above-described arrangement of the gasket 125 (FIGS. 3 and 4) or even the gaskets 65 and 87 (FIG. 1) is able to maintain a fluid tight seal even if the adjacent seal components, such as the bellows flange 97 (FIGS. 3 and 4) and the carbon seal ring 16 have different rates of thermal expansion. Typically, during use, relatively high temperatures of the fluid 20 are encountered and as a result of such increased temperatures, the bellows flange 97 expands at a greater rate than the silicon carbide seal ring 16. This thermal expansion thereby increases the radial distance between the shoulder surface 117 and the opposing axial surface 102 of the bellows flange 97. Nevertheless, the hydraulic fluid pressure which is present in the gasket slot 130 deforms the upper and lower legs 127 and 128 radially away from each other and maintains the fluid tight seals defined thereby as seen in FIG. 4.

Also, the hydraulic fluid pressure 20 acts axially against the gasket end wall 126 which wall 126 is thereby pressed axially against the opposing radial flange surface 103 which increases the frictional contact therebetween. As a result, it is believed that the friction between the opposing surfaces 103 and 138 causes the gasket end wall 126 to move radially outwardly in unison with the radial movement of the bellows flange 97 caused by thermal expansion. Thus, the gasket end wall 126 does not slide or shift relative to the radial flange leg 101 even during such thermal expansion.

Generally, balance shift occurs in welded metal bellows seals. Under increasing pressure, bellows diaphragms deflect and the balance diameter shifts towards the low pressure side of the bellows. In the case of OD (outside diameter) pressurization, the bellows balance diameter shifts radially inwards towards the ID (inside diameter) of the bellows. The occurrence of bellows balance diameter shift is known and does not require a more detailed discussion herein.

In the present invention, the gasket arrangement takes advantage of the bellows balance diameter shift which occurs during operation. Referring to FIG. 4, the bellows balance diameter (BD) is identified generally by dotted reference line 145. Also, the diameter at which the gasket 125 seals, namely the gasket diameter (GD) is identified by dotted reference line 147. The gasket diameter 147 is defined by the diameter of the gasket shoulder surface 117 which is the radial innermost point at which the sealed fluid pressure acts. While the seal fluid 20 can migrate radially inwardly between the lower leg surface 132 and the shoulder end wall 116 until reaching the shoulder side surface 117, notches may also be provided in the end face 132 to facilitate fluid migration.

A hydraulic opening force acts on the left of the bellows flange 97 and is opposed by a hydraulic closing force acting on the right side of the bellows flange 97. The opposing pressure forces cancel out above the balance diameter 145. As a result, the area defined radially between the balance diameter 145 and the gasket diameter 147 results in a net hydraulic closing or opening force depending on their location with respect to each other.

Preferably, at zero pressure conditions, the bellows balance diameter 145 is greater than the gasket diameter 147 and as a result, under initial pressurization, the hydraulic opening force exceeds the hydraulic closing force resulting in a net hydraulic opening force. When the balance diameter 145 equals the gasket diameter 147, which occurs after a pressurization and a resulting balance diameter shift, the hydraulic opening force equals the hydraulic closing force and the net hydraulic load is zero, wherein the spring load of the bellows 96 maintains a closing force which continues to act on the bellows flange 97. When the balance diameter 145 continues to shift under increasing pressurization and becomes less than the gasket diameter 147, the hydraulic closing force exceeds the hydraulic opening force resulting in a net hydraulic closing force.

The equations which define the net hydraulic opening force when the balance diameter 145 is greater than the gasket diameter 147 and the equation which defines the net hydraulic closing force when the gasket diameter 147 is less than the balance diameter 145, are defined as follows:

Fopening=P*(Pi/4)*(BD$^2$−GD$^2$);BD>GD

Fclosing=P*(Pi/4)*(GD$^2$−BD$^2$);GD>BD

Figure 5:
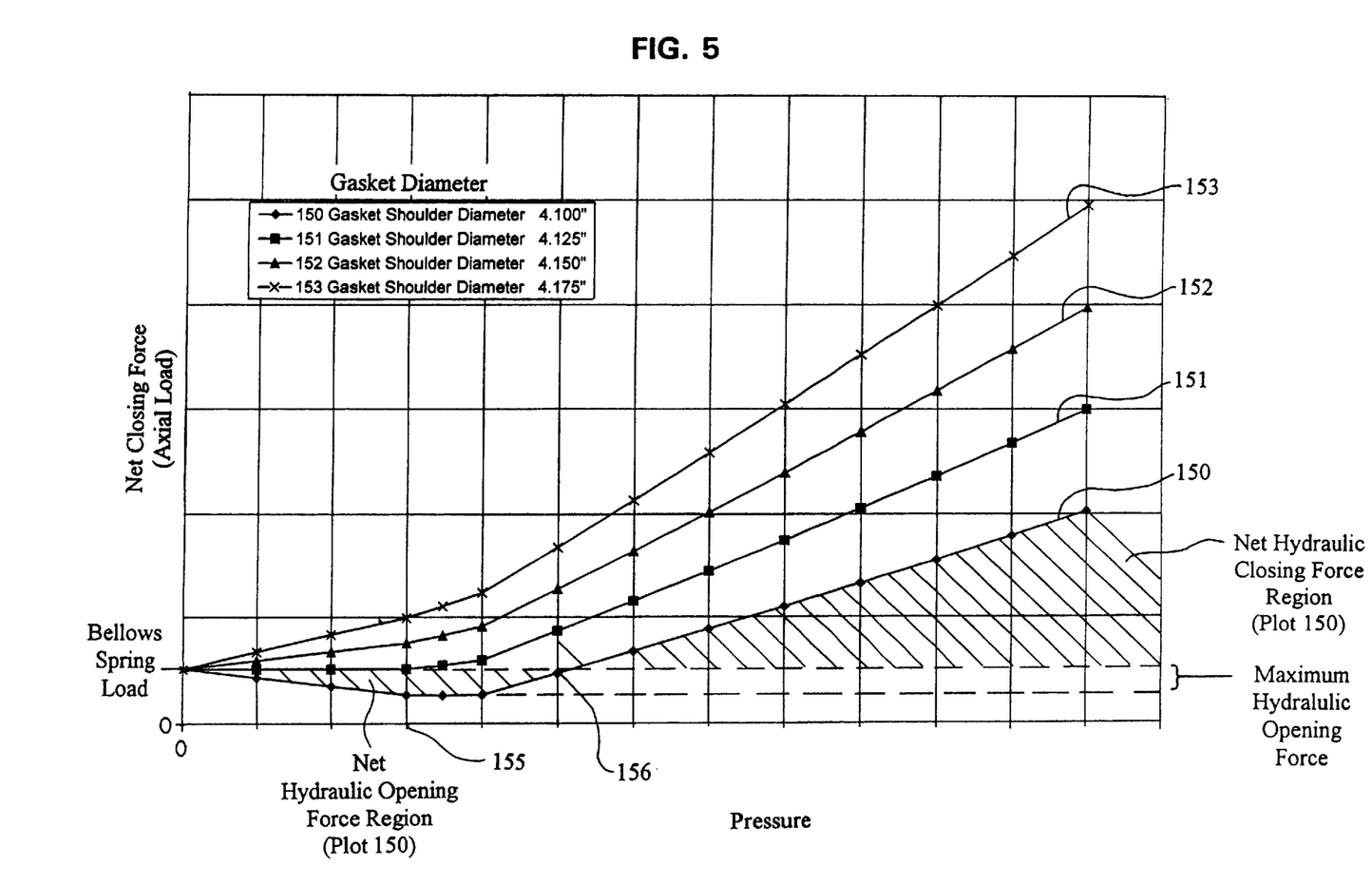
FIG. 5 is a graph diagrammatically illustrating the total axial closing force as a function of bellows spring load, fluid pressure and bellows balance diameter shift for several fixed gasket shoulder diameters.

This phenomenon is diagrammatically illustrated in the graph of FIG. 5 which illustrates four different performance plots reflecting the seal performance resulting from different gasket diameters 147, the bellows balance diameter being initially at 4.125 inches for each of the four plots.

The first plot is identified by reference numeral 150 and illustrates the net axial load acting to close the bellows flange 97. Initially, when the fluid pressure in the sealing chamber 19 is zero, the axial load is equal to the bellows spring load. This is also true for the remaining three plots identified by reference numerals 151, 152 and 153.

The first plot 150 reflects the performance when the gasket diameter 147 equals 4.100 inches which is less than the bellows balance diameter 145 which is 4.125 inches. During initial pressurization and balance shift, the hydraulic opening force is greater than the hydraulic closing force and the net closing force actually decreases until it reaches a minimum value. Note that initially the bellows balance diameter 145 does not shift. After the bellows diameter begins to shift at point 155 for plot 150 a change occurs in the slope of the line describing the net closing force. The net closing force actually reaches a minimum value at a higher pressure than that at which the bellows balance diameter 145 begins to shift. The balance continues to shift radially inwardly, the net closing force begins to increase until the balance diameter 145 equals the gasket shoulder diameter 147 at point 156 on plot 150 and the net closing force is again equal to the spring force.

As for the remaining plots, the axial load and pressure is determined relative to alternate diameters for the gasket diameter 147. Plot line 151 refers to the performance when the gasket diameter 147 initially is 4.125 inches and thus, is equal to the bellows balance diameter 145. During such period, the axial closing force remains flat and then increases when the bellows balance diameter 145 begins to shift.

The plot line 152 relates to the gasket diameter being 4.150 inches which is greater than the mean bellows balance diameter 145 and thus, as the fluid is pressurized, the hydraulic closing force begins to increase immediately. This effect is more pronounced for plot line 153 which reflects the performance when the gasket diameter 147 is 4.175 inches. In both cases, the hydraulic closing force begins to increase more quickly when the balance begins to shift.

Thus, the gasket diameter 147 preferably is less than the mean balance diameter 145 since a closing force is still provided on the bellows flange 97 during the first phase when the axial load is decreasing and thereafter, once the axial load increases, the axial closing force increases at a lower rate than what occurs with the alternate performance plots 151, 152 and 153. By minimizing the axial load on the bellows flange 97 through selection of the gasket diameter 147, the axial load transmitted to the seal ring 16 through the gasket leg 128 is minimized which reduces stress and the possibility of buckling in gasket leg 128.

Referring to FIG. 1, with respect to the above described arrangement, the gasket arrangement provides an improved connection between the bellows flange 97 and the seal ring 16. Further, the secondary seal arrangement of the invention also provides improved performance between other adjacent components in the mechanical seal 10 including between the rotating seal ring 15 and the shaft sleeve 29 as well as between the bellows adaptor 92 and the seal housing 80.

Briefly in operation, the mechanical seal 10 is provided to seal the shaft 12. The seal rings 15 and 16 normally are biased axially together due to the bellows spring load which pushes the seal ring 16 axially toward the rotatable seal ring 15. The gasket 125 (FIG. 2) is provided between the seal ring 16 and the bellows flange 97 to maintain a seal therebetween whether the shaft 12 is rotating or not.

Referring to FIGS. 1 and 2, during shaft rotation relative radial movement may occur between the seal ring 16 and the bellows flange 97. The gasket 125 of the invention, however has deflectable upper and lower gasket legs 127 and 128 which accommodate this radial movement to optimize seal performance. Additionally, the lower leg of the gasket 125 transmits the axial load between the bellows flange and the seal ring.

When the sealing chamber 19 is not pressurized, the lower leg 128 still accommodates the axial loads and as the fluid pressure increases, the additional fluid pressure within the slot of the gasket 125 further stiffens the lower leg 128 and prevents buckling thereof. This is true even after thermal expansion (FIG. 4), after which expansion the flange surface 104 shifts radially away from the gasket diameter 147. Before expansion as seen in FIG. 2, the surface 104 is approximately the same diameter as the gasket diameter 147. Furthermore, the gasket arrangement makes use of the radial shifting of the bellows balance diameter 145 (FIG. 4) to reduce the axial loads acting on the seal ring 16.

While the gasket 125 illustrates an arrangement wherein the gasket 125 is provided between two seal components, one of these being spring loaded, similar axially constrained gasket arrangements can be provided between adjacent seal components which do not move axially. In one example, the gasket 65 (FIG. 2) is provided between the rotatable seal ring 15 and the support element therefore, namely the sleeve flange 31. In another example, the gasket 87 (FIG. 1) is provided between a support element, namely the seal housing 80 and a bellows adapter.

It should also be understood that while the lower leg of each gasket 65, 87 and 125 is axially constrained, the adjacent components may also be reversed. For example, the seal ring 16 may be formed with an axial extension which is disposed radially outwardly of a bellows flange rather than inwardly wherein the gasket is formed as a mirror image of the construction disclosed herein. As a result, the axially confined leg of the gasket would be disposed radially outwardly of the other leg.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a mechanical seal which is mountable to equipment having a rotatable shaft to sealingly separate a pressurized fluid region from an outer region, said mechanical seal having a seal housing and a pair of annular seal rings which are disposed axially adjacent to each other and have opposing seal faces which define a sealing region therebetween, one of said seal rings being supported on said seal housing and the other of said seal rings adapted to be supported on the rotatable shaft such that said sealing region, separates the pressurized fluid region from the outer region during shaft rotation, comprising the improvement wherein said mechanical seal includes a plurality of seal components which are disposed axially one next to the other and are each supported by a respective support element, at least two of said seal components being said seal rings, and a biasing arrangement being provided which generates an axial load acting through said seal components such that each said seal component and said respective support element are biased one towards the other, said biasing arrangement cooperating with said support element supporting one of said seal rings such that said axial load biases said one of said seal rings axially into sealing engagement with the other of said seal rings, at least one of said seal components and said respective support element having a gasket disposed radially therebetween which resiliently permits radial movement of said seal component relative to said respective support element while supporting said axial load acting therebetween, said gasket having a gasket end wall which extends radially and first and second gasket legs which project axially from said gasket end wall and are radially spaced apart from each other, said one seal component and said support element therefor respectively including an axial component surface and an opposing axial element surface disposed in radially spaced relation and including a radial component surface and an opposing radial element surface disposed in axially spaced relation to define a gasket space, said first and second gasket legs being disposed radially between and acting against said axial element surface and said axial component surface respectively to define a fluid seal while permitting relative radial movement between said one seal component and said support element therefor, at least one of said first and second gasket legs also being confined axially in compression between said radial element surface and said radial component surface to support said axial load acting therebetween.

2. The mechanical seal according to claim 1, wherein only one of said gasket legs is confined between said radial component surface and said radial element surface.

3. The mechanical seal according to claim 2, wherein said gasket end wall is spaced radially from at least one of said axial component surface and said axial element surface such that radial movement of said one seal component and said respective support element is resisted by said gasket legs.

4. The mechanical seal according to claim 1, wherein said gasket end wall and said first and second gasket legs define an annular slot which opens axially from an open side of said gasket, said open side of said gasket being exposed to said pressurized fluid region to receive pressurized fluid therein, said pressurized fluid urging said first and second gasket legs radially apart from each other.

5. The mechanical seal according to claim 4, wherein said gasket slot includes a spring therein which biases said first and second gasket legs radially apart from each other.

6. The mechanical seal according to claim 1, wherein said one seal component is the rotatable one of said seal rings, and said respective support element includes a shaft connector which permits connection to a rotatable shaft.

7. The mechanical seal according to claim 1, wherein said biasing arrangement comprises a resilient biasing member, and said one seal component is a support ring and said respective support element is defined by said seal housing, said support ring being connected to said resilient biasing member which acts on said one of said seal rings to bias said seal rings into sealing engagement with each other.

8. A mechanical seal for sealing a rotatable shaft comprising:
   a seal housing;
   a first seal ring non-rotatably connected to said seal housing;
   a second seal ring which is connectable to a rotating shaft, said first and second seal rings having opposing seal faces and a biasing device which biases said first and second seal rings axially together into sealing engagement by an axial load; and
   at least one annular support element which supports one of said first and second seal rings wherein an annular flexible seal gasket is disposed between said support element and said one seal ring supported thereby, said seal ring and said support element including respective end surfaces which are axially spaced apart in opposing relation and side surfaces which are radially spaced apart in opposing relation to define a gasket pocket therebetween, said seal gasket being disposed within said gasket pocket and comprising a gasket end wall and first and second gasket legs which project axially from said gasket end wall and are radially spaced apart from each other, said first and second gasket legs pressing radially outwardly against said opposed side surfaces to define a fluid seal while permitting relative radial movement between said seal ring and said support element, and one of said first and second gasket legs being confined axially in compression between said opposing end surfaces to support said axial load of said biasing device.

9. The mechanical seal according to claim 8, wherein only one of said gasket legs is confined axially by said opposing end surfaces wherein the other of said first and second gasket legs is fixed axially relative to one of said opposing end surfaces but is spaced axially from the other of said opposing end surfaces so as to be movable axially relative thereto.

10. The mechanical seal according to claim 8, wherein said first and second gasket legs define an annular gasket slot therebetween having an open side which opens axially, said first and second seal rings sealing a pressurized fluid of a pressurized fluid region from an outer region wherein said pressurized fluid is received within said gasket slot to prevent buckling of said axial load supporting gasket leg.

11. The mechanical seal according to claim 10, wherein a spring member is provided within said gasket slot, said spring member biasing said first and second gasket legs radially outwardly against said opposing side surfaces.

12. The mechanical seal according to claim 8, wherein said mechanical seal has a pressurized seal region and a secondary seal region, said pressurized seal region including a pressurized fluid therein wherein said first and second seal rings prevent leakage of said pressurized fluid into said secondary seal region.

13. The mechanical seal according to claim 12, wherein said first and second gasket legs define a slot therebetween having an opening which receives said pressurized fluid therethrough, said pressurized fluid acting radially outwardly on said first and second gasket legs to prevent buckling of said confined gasket leg under said fluid closing force and said axial load.

14. The mechanical seal according to claim 13, wherein an increase in pressure of said pressurized fluid increases said fluid closing force while simultaneously increasing the pressure on said confined gasket leg to increase resistance to buckling thereof.

15. A mechanical seal for sealing a rotatable shaft comprising:
   a seal housing;
   a first seal ring non-rotatably connected to said seal housing;
   a second seal ring which is connectable to a rotating shaft, said first and second seal rings having opposing seal faces which face axially and are disposed in sealing engagement with each other to separate a pressurized fluid region from an outer region, said pressurized fluid region having a fluid which defines a hydraulic fluid pressure;
   a bellows assembly having a bellows and a support element at one end of the bellows which supports one of said first and second seal rings thereon; and
   a flexible seal gasket disposed between said support element and said one seal ring supported thereby to define a fluid seal, said seal ring and said support element including respective end surfaces which are axially spaced apart in opposing relation and side surfaces which are radially spaced apart in opposing relation, said seal gasket including a gasket end wall and first and second gasket legs which project axially from said gasket end wall and are radially spaced apart from each other, said first and second gasket legs pressing radially outwardly against said opposing side surfaces in contact therewith and at least one of said first and second gasket legs being confined axially in compression between said opposing end surfaces to support an axial load generated by said bellows, said side surface which contacts said confined gasket leg defining a gasket diameter wherein a hydraulic opening force is defined by said fluid pressure which acts across one side of said support element to said gasket diameter and a hydraulic closing force is defined on an opposite side of said support element by said fluid pressure acting on said bellows, said bellows having a bellows balance diameter which is greater than said gasket diameter.

16. The mechanical seal according to claim 15, wherein said hydraulic fluid pressure of said fluid is variable, said bellows being deformable under increasing hydraulic fluid pressure wherein deformation of said bellows shifts said bellows balance diameter radially inwardly toward said gasket diameter.

17. The mechanical seal according to claim 16, wherein said hydraulic opening force initially is greater than said hydraulic closing force as said hydraulic fluid pressure increases during which time said hydraulic closing force in combination with an axial load defined by said bellows remains greater than said hydraulic opening force.

18. The mechanical seal according to claim 17, wherein said hydraulic closing force is greater than said hydraulic opening force after said bellows balance diameter has shifted so as to be equal to said gasket diameter.

19. In a mechanical seal which is mountable to equipment having a rotatable shaft to sealingly separate a pressurized fluid region from an outer region, said mechanical seal having a seal housing and a pair of annular seal rings which are disposed axially adjacent to each other and have opposing seal faces which define a sealing region therebetween, a stationary one of said seal rings being supported on said seal housing and the other of said seal rings adapted to be supported on the rotatable shaft so as to rotate therewith such that said sealing region separates the pressurized fluid region from the outer region during shaft rotation, comprising the improvement wherein said mechanical seal includes a plurality of seal components which are disposed axially one next to the other and are each supported by a respective support element, at least two of said seal components being said seal rings wherein at least one of said seal rings is loaded axially into sealing engagement with the other of said seal rings, said respective support element of said rotatable seal ring having a shaft connector which permits connection to a rotatable shaft, and said rotatable seal ring and said respective support element having a gasket disposed radially therebetween which resiliently permits radial movement of said seal component relative to said respective support element while supporting axial loads therebetween, said gasket having a gasket end wall which extends radially and first and second gasket legs which project axially from said gasket end wall and are radially spaced apart from each other, said one seal component and said respective support element respectively including an axial component surface and an opposing axial element surface disposed in radially spaced relation and including a radial component surface and an opposing radial element surface disposed in axially spaced relation to define a gasket space, said first and second gasket legs being disposed radially between and acting against said axial element surface and said axial component surface respectively to define a fluid seal while permitting relative radial movement between said support ring and said respective support element, at least one of said first and second gasket legs also being confined axially in compression between said radial element surface and said radial component surface to support axial loads.

20. In a mechanical seal which is mountable to equipment having a rotatable shaft to sealingly separate a pressurized fluid region from an outer region, said mechanical seal having a seal housing and a pair of annular seal rings which are disposed axially adjacent to each other and have opposing seal faces which define a sealing region therebetween, one of said seal rings being supported on said seal housing and the other of said seal rings adapted to be supported on the rotatable shaft such that said sealing region separates the pressurized fluid region from the outer region during shaft rotation, comprising the improvement wherein said mechanical seal includes a plurality of seal components which are disposed axially one next to the other and are each supported by a respective support element, at least two of said seal components being said seal rings wherein at least one of said seal rings is loaded axially into sealing engagement with the other of said seal rings, one of said seal components being a support ring and said respective support element being defined by said seal housing, said support ring being connected to a resilient biasing member which acts on one of said seal rings to bias said seal rings into sealing engagement with each other, said support ring and said support element having a gasket disposed radially therebetween which resiliently permits radial movement of said support ring relative to said respective support element while supporting axial loads therebetween, said gasket having a gasket end wall which extends radially and first and second gasket legs which project axially from said gasket end wall and are radially spaced apart from each other, said support ring and said respective support element respectively including an axial component surface and an opposing axial element surface disposed in radially spaced relation and including a radial component surface and an opposing radial element surface disposed in axially spaced relation to define a gasket space, said first and second gasket legs being disposed radially between and acting against said axial element surface and said axial component surface respectively to define a fluid seal while permitting relative radial movement between said support ring and said respective support element, at least one of said first and second gasket legs also being confined axially in compression between said radial element surface and said radial component surface to support axial loads.

21. The mechanical seal according to claim 20, wherein said resilient biasing member is a bellows.

22. In a mechanical seal which is mountable to equipment having a rotatable shaft to sealingly separate a pressurized fluid region from an outer region, said mechanical seal having a seal housing and a pair of annular seal rings which are disposed axially adjacent to each other and have opposing seal faces which define a sealing region therebetween, one of said seal rings being supported on said seal housing and the other of said seal rings adapted to be supported on the rotatable shaft such that said sealing region separates the pressurized fluid region from the outer region during shaft rotation, comprising the improvement wherein said mechanical seal includes a plurality of seal components which are disposed axially one next to the other and are each being supported by a respective support element, at least two of said seal components being said seal rings wherein at least one of said seal rings is loaded axially by an axial load into sealing engagement with the other of said seal rings, the mechanical seal further including a bellows assembly having an adaptor at one end thereof, a bellows flange at an opposite end thereof and a bellows connected axially between said adaptor and said bellows flange, said bellows flange defining one of said support elements and said respective seal component thereof being one of said seal rings, said adaptor defining another of said seal components and said support element therefor being defined by said seal housing, at least one of said seal components and said respective support element having a gasket disposed radially therebetween which resiliently permits radial movement of said seal component relative to said respective support element while supporting axial loads therebetween, said gasket having a gasket end wall which extends radially and first and second gasket legs which project axially from said gasket end wall and are radially spaced apart from each other, said one seal component and said support element therefor respectively including an axial component surface and an opposing axial element surface disposed in radially spaced relation and including a radial component surface and an opposing radial element surface disposed in axially spaced relation to define a gasket space, said first and second gasket legs being disposed radially between and acting against said axial element surface and said axial component surface respectively to define a fluid seal while permitting relative radial movement between said one seal component and said support element therefor, at least one of said first and second gasket legs also being confined axially in compression between said radial element surface and said radial component surface to support axial loads.

23. The mechanical seal according to claim 22, wherein one said gasket is provided between said bellows flange and said seal ring supported thereby and another said gasket is provided between said adaptor and said support element defined on said seal housing.

24. A mechanical seal for sealing a rotatable shaft comprising:

a seal housing;

a first seal ring non-rotatably connected to said seal housing;

a second seal ring which is connectable to a rotating shaft, said first and second seal rings having opposing seal faces and a biasing device which comprises a bellows that biases said first and second seal rings axially together into sealing engagement by an axial load, said bellows having an initial balance diameter; and at least one annular support element which supports one of said first and second seal rings wherein an annular flexible seal gasket is disposed between said support element and said one seal ring supported thereby, said seal ring and said support element including respective end surfaces which are axially spaced apart in opposing relation and side surfaces which are radially spaced apart in opposing relation to define a gasket pocket therebetween, said seal gasket being disposed within said gasket pocket and comprising a gasket end wall and first and second gasket legs which project axially from said gasket end wall and are radially spaced apart from each other, said first and second gasket legs pressing radially outwardly against said opposed side surfaces to define a fluid seal while permitting relative radial movement between said seal ring and said support element, and one of said first and second gasket legs being confined axially in compression between said opposing end surfaces to support axial loads, said confined gasket leg being in contact with said side surface of said seal ring wherein said side surface of said seal ring defines a gasket diameter, said gasket diameter being less than said bellows balance diameter.

25. The mechanical seal according to claim 24, wherein said first and second seal rings seal a pressurized fluid of a pressurized fluid region from an outer region, said pressurized fluid acting on one axial side of said support element and said gasket to define an opening force and acting on said bellows on an opposite side of said support element to define a closing force, a pressure of said pressurized fluid being increased and said bellows deforming in response to said pressure increase which shifts said bellows balance diameter radially inwardly toward said gasket diameter.

26. In a mechanical seal which is mountable to equipment having a rotatable shaft and defines a primary seal to sealingly separate a pressurized first fluid region from a second fluid region, said mechanical seal including a seal housing having an interior chamber through which a rotatable shaft is received, said mechanical seal having a support element associated with one of said shaft and said housing and an annular seal component supported on said support element within said interior chamber, a biasing arrangement being provided which biases said support element and said seal component one towards the other wherein opposing end surfaces and opposing side surfaces of said support element and said seal component are maintained respectively in axially and radially spaced relation by an annular elastomeric gasket disposed therebetween, said gasket having a C-shaped cross-sectional shape defined by gasket legs which are radially spaced apart and extend axially to define an opening therebetween, said opening receiving said pressurized fluid therein so as to be pressed apart against said opposing side surfaces in direct contact therewith to define a secondary fluid seal, one of said gasket legs being confined axially in contact with both of said opposing end surfaces to rigidly support said axial load acting axially between said seal component and said support element and maintain said seal component and said support element in said axially spaced relation.

27. The mechanical seal according to claim 26, wherein said seal component is a seal ring having a seal face, which faces axially and contacts a further seal ring to define said primary seal.

28. The mechanical seal according to claim 27, wherein said support element is disposed on said housing and prevents rotation of said seal ring during shaft rotation.

29. The mechanical seal according to claim 27, wherein said support element is adapted to be interconnected with said shaft such that said seal ring is rotatable during rotation of said shaft.

30. The mechanical seal according to claim 26, wherein said support element is defined on said housing and said seal component is an annular ring which is connected directly to said biasing arrangement which said biasing arrangement biases said annular ring axially towards said support element.

* * * * *